United States Patent
Xu et al.

(10) Patent No.: US 12,028,201 B2
(45) Date of Patent: Jul. 2, 2024

(54) METHOD AND DEVICE FOR SENDING DISCOVERY SIGNAL ON UNLICENSED CARRIER, AND ACCESS POINT

(71) Applicant: ZTE Corporation, Guangdong (CN)

(72) Inventors: Hanqing Xu, Guangdong (CN); Yajun Zhao, Guangdong (CN); Linmei Mo, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/390,765

(22) Filed: Jul. 30, 2021

(65) Prior Publication Data

US 2021/0359893 A1 Nov. 18, 2021

Related U.S. Application Data

(63) Continuation of application No. 15/505,249, filed as application No. PCT/CN2015/071156 on Jan. 20, 2015, now abandoned.

(30) Foreign Application Priority Data

Aug. 22, 2014 (CN) .......................... 201410419415.2

(51) Int. Cl.
*H04L 27/26* (2006.01)
*H04L 27/00* (2006.01)
(Continued)

(52) U.S. Cl.
CPC ...... *H04L 27/2692* (2013.01); *H04L 27/0006* (2013.01); *H04L 27/26* (2013.01);
(Continued)

(58) Field of Classification Search
None
See application file for complete search history.

(56) References Cited

U.S. PATENT DOCUMENTS 9,526,064 B2 * 12/2016 Kim .................... H04W 56/001
2007/0041334 A1 2/2007 Song et al.
(Continued)

FOREIGN PATENT DOCUMENTS

CN 101043717 A 9/2007
CN 103369583 A 10/2013
(Continued)

OTHER PUBLICATIONS

ZTE, "Discussion on RRM measurement and DRS design for LAA," 3GPP TSG RAN WG1 Meeting #80bis, R1-151806, Belgrade, Serbia, Apr. 20-24, 2015, 5 pages.
(Continued)

*Primary Examiner* — Jason E Mattis
*Assistant Examiner* — Bao G Nguyen
(74) *Attorney, Agent, or Firm* — Perkins Coie LLP

(57) ABSTRACT

Provided are a method and apparatus for occupying an unlicensed carrier to send a discovery signal, and an access point. The method includes the following steps. A parameter of a discovery signal sent on an unlicensed carrier by an access point is configured. The access point sends the discovery signal on the unlicensed carrier. The technical solution of the present disclosure can reduce the time for processing items other than data sending (such as synchronization) after each time the access point preempts a resource, and can improve the spectral efficiency of the unlicensed carrier.

16 Claims, 1 Drawing Sheet

(51) Int. Cl.
  *H04W 48/12* (2009.01)
  *H04W 48/16* (2009.01)
  *H04W 72/0453* (2023.01)
  *H04W 72/54* (2023.01)

(52) U.S. Cl.
  CPC .......... *H04W 48/12* (2013.01); *H04W 48/16* (2013.01); *H04W 72/0453* (2013.01); *H04W 72/54* (2023.01)

(56) References Cited

U.S. PATENT DOCUMENTS

| | | | |
|---|---|---|---|
| 2009/0201860 A1* | 8/2009 | Sherman | H04W 72/1215 370/329 |
| 2010/0027478 A1 | 2/2010 | Chu et al. | |
| 2014/0094213 A1 | 4/2014 | Khoshnevis et al. | |
| 2014/0269464 A1 | 9/2014 | Park et al. | |
| 2015/0223245 A1* | 8/2015 | Cheng | H04J 11/0069 370/329 |
| 2015/0264090 A1 | 9/2015 | Kim et al. | |
| 2015/0264699 A1* | 9/2015 | Fwu | H04W 72/1215 370/329 |
| 2015/0312784 A1 | 10/2015 | You et al. | |
| 2015/0373628 A1* | 12/2015 | Hwang | H04W 48/10 370/338 |
| 2015/0373682 A1 | 12/2015 | Bashar et al. | |
| 2016/0043841 A1* | 2/2016 | Lunttila | H04W 24/08 370/280 |
| 2016/0057693 A1 | 2/2016 | Nagata et al. | |
| 2016/0165585 A1* | 6/2016 | Saiwai | H04W 48/14 370/329 |
| 2016/0262100 A1 | 9/2016 | Larsson et al. | |
| 2017/0181057 A1* | 6/2017 | Kishiyama | H04W 48/20 |
| 2017/0238272 A1* | 8/2017 | You | H04L 5/001 370/350 |
| 2018/0249467 A1* | 8/2018 | Zheng | H04L 5/005 |

FOREIGN PATENT DOCUMENTS

| | | |
|---|---|---|
| CN | 103581093 A | 2/2014 |
| CN | 103945497 A | 7/2014 |
| EP | 2947925 A1 | 11/2015 |
| WO | 2013187605 A1 | 12/2013 |
| WO | 2014023252 A1 | 2/2014 |
| WO | 2014109615 A1 | 7/2014 |
| WO | 2014112595 A1 | 7/2014 |
| WO | 2014121697 A1 | 8/2014 |
| WO | 2015199902 A1 | 12/2015 |

OTHER PUBLICATIONS

3GPP TS 36.213 V13.1.0 (Mar. 2016), Technical Specification, 3rd Generation Partnership Project; Technical Specification Group Radio Access Network; Evolved Universal Terrestrial Radio Access (E-UTRA); Physical layer procedures, Release 13, 361 pages.

3GPP TS 37.213 version V16.3.0 Release 16, LTE; 5G; Physical layer procedures for shared spectrum channel ccess, ETSI TS 137 213 V16.3.0 (Nov. 2020), 28 pages.

3GPP TS 38.213 version 16.3.0 Release 16, 5G; NR; Physical layer procedures for control, ETSI TS 138 213 V16.3.0 (Nov. 2020), 181 pages.

Office Action dated Aug. 20, 2019 for Chinese Patent Application No. 201410419415.2 and English Translation.

International Search Report and Written Opinion issued in International Patent Application No. PCT/CN2015/071156, dated May 21, 2015, 16 pages. English translation included.

International Preliminary Report on Patentability issued in International Patent Application No. PCT/CN2015/071156, dated Feb. 28, 2017, 5 pages.

European Search Report issued in EP Patent Application No. 15758443.4, dated Jul. 25, 2017, 8 pages.

European Communication under Rule 71(3) EPC issued in EP Patent Application No. 15758443.4, dated May 24, 2018, 58 pages.

* cited by examiner

METHOD AND DEVICE FOR SENDING DISCOVERY SIGNAL ON UNLICENSED CARRIER, AND ACCESS POINT

CROSS-REFERENCE TO RELATED APPLICATIONS

This patent document is a continuation of U.S. patent application Ser. No. 15/505,249, filed on Feb. 21, 2017, which is a national stage of and claims the benefit of priority to International Patent Application No. PCT/CN2015/071156, filed on Jan. 20, 2015, which claims the benefit of priority of Chinese Patent Application No. 201410419415.2, filed on Aug. 22, 2014. The entire contents of the before-mentioned patent applications are incorporated by reference as part of the disclosure of this application.

TECHNICAL FIELD

The present disclosure relates to the technical field of sending a discovery signal on an unlicensed carrier, and more particularly to a method and apparatus for sending a discovery signal on an unlicensed carrier, and an access point.

BACKGROUND

Long Term Evolution Unlicensed LTE-U refers to deployment of LTE in an unlicensed spectrum to meet an increasing capacity demand of an LTE system and to improve the usage efficiency of the unlicensed spectrum, and is a possible important evolution direction of LTE and future wireless communication. During design of the LTE-U, it is necessary to consider how to fairly and friendly compete over the unlicensed spectrum between an inter-system, such as Wireless Fidelity (WiFi) and radar, and an LTE-U same-system to transmit data, and meanwhile, LTE technical characteristics need to be uninfluenced and retained to the greatest extent. According to specification of a 3GPP standard conference, the LTE-U system may also be called a LTE Licensed Assisted Access LAA system. At present, an unlicensed spectrum utilization mode for LAA/LTE-U includes a Carrier Aggregation Supplemental Downlink CA SDL mode, a Carrier Aggregation Time Division Duplex CA TDD mode and a Standalone mode. Herein, the CA SDL mode is a current mainstream mode.

Each time an unlicensed carrier access point or a base station preempts a resource, a series of processes such as synchronization need to be performed, which may occupy a great amount of time (few ms to ten or more ms magnitude). A controlled maximum occupation time length for the unlicensed carrier is about few tens of ms (regionally different, generally). That is to say, quite a few of the time sources preempted by the unlicensed carrier access point or the base station each time are used for operations other than data sending processing, which may greatly reduce the spectral usage efficiency and performance of an LAA/LTE-U system. In the related art, a corresponding solution has not been provided for the problem, i.e., how to reduce an overhead proportion of the above-mentioned process to the preempted resources.

SUMMARY

The present disclosure needs to provide a method and system for sending a discovery signal on an unlicensed carrier, and an access point, to reduce the time for processing items other than data sending (such as synchronization) after each time the access point preempts a resource, and improve the spectral efficiency of the unlicensed carrier.

To solve the above-mentioned technical problem, the technical solution is adopted as follows.

A method for sending a discovery signal on an unlicensed carrier includes the following steps.

A parameter of a discovery signal sent on an unlicensed carrier by an access point is configured.

The access point sends the discovery signal on the unlicensed carrier.

In an exemplary embodiment, the discovery signal is used for coarse synchronization, measurement and access point discovery of the access point and User Equipment UE served by the unlicensed carrier on the unlicensed carrier.

The parameter of the discovery signal includes: a sending pattern, a power, a port, an occupied bandwidth, a time frequency resource, and a measurement pattern. Herein, the sending pattern includes a sending period, an offset, and a duration. The measurement pattern includes a measurement period, an offset, a duration, and a measurement gap.

In an exemplary embodiment, the step that a parameter of a discovery signal sent on an unlicensed carrier by an access point is configured includes that: a parameter of a discovery signal sent on an unlicensed carrier by an access point is configured according to a centralized configuration mode, a distributed configuration mode or a mixed configuration mode.

Herein, the step that a parameter of a discovery signal sent on an unlicensed carrier by an access point is configured according to a centralized configuration mode includes that: a macro cell, a cluster head or a centralized controller allocates the parameter of the discovery signal sent on each unlicensed carrier by one or more neighboring access points centrally, or a certain neighboring access point is specified as the macro cell, the cluster head or the centralized controller to allocate the parameter of the discovery signal sent on each unlicensed carrier by one or more neighboring access points centrally.

The step that a parameter of a discovery signal sent on an unlicensed carrier by an access point is configured according to a distributed configuration mode includes that: the parameter of the discovery signal is configured on each unlicensed carrier by each access point.

The step that a parameter of a discovery signal sent on an unlicensed carrier by an access point is configured according to a mixed configuration mode includes that: after configuring the parameter of the discovery signal on each unlicensed carrier, each access point reports the parameter to the macro cell, the cluster head or the centralized controller, and the macro cell, the cluster head or the centralized controller performs coordinated adjustment.

In an exemplary embodiment, the step that the access point sends the discovery signal on the unlicensed carrier includes the following steps.

Before preempting the unlicensed carrier, the access point sends the discovery signal on the unlicensed carrier.

Or, after preempting the unlicensed carrier, the access point sends the discovery signal on the preempted unlicensed carrier.

In an exemplary embodiment, the method further includes the following steps.

The parameter of the discovery signal is sent to the UE served by the unlicensed carrier and/or a neighboring access point of the access point.

In an exemplary embodiment, the step that the parameter of the discovery signal is sent to the UE served by the unlicensed carrier and/or a neighboring access point of the access point includes the following steps.

The parameter of the discovery signal is sent to the UE by a licensed carrier or the preempted unlicensed carrier. Or, the parameter of the discovery signal is transferred to the neighboring access point of the access point by backhaul or broadcast.

In an exemplary embodiment, before the access point sends the discovery signal on the unlicensed carrier, the method further includes the following steps.

The unlicensed carrier on which a discovery signal will be sent is screened according to a service situation, an interference situation and an occupation situation of the unlicensed carrier. Herein, the unlicensed carrier on which a discovery signal will be sent includes one or more unlicensed carriers.

In an exemplary embodiment, the step that the access point sends the discovery signal on the unlicensed carrier includes the following steps.

When it is determined that one or more of the following conditions are satisfied, the access point sends the discovery signal on the unlicensed carrier:

a sending period of the discovery signal is greater than a preset period threshold;

a power of the discovery signal is smaller than a preset power threshold;

an occupied bandwidth of the discovery signal is smaller than a preset bandwidth threshold;

a duration of the discovery signal is smaller than a preset time threshold; and a number of ports of the discovery signal is smaller than a preset number threshold.

In an exemplary embodiment, the discovery signal includes:

a downlink reference signal, or a downlink reference signal after a corresponding protocol is modified.

In an exemplary embodiment, the downlink reference signal includes one or more of the following signals: a Primary Synchronization Signal/Secondary Synchronization Signal PSS/SSS, a Cell-specific Reference Signal CRS, a Channel State Information-Reference Signal CSI-RS, and a Position Reference Signal PRS.

An apparatus for sending a discovery signal on an unlicensed carrier includes a parameter configuration module and a control sending module.

The parameter configuration module is arranged to configure a parameter of a discovery signal sent on an unlicensed carrier by an access point.

The control sending module is arranged to send the discovery signal on the unlicensed carrier.

In an exemplary embodiment, the discovery signal is used for coarse synchronization, measurement and access point discovery of the access point and UE served by the unlicensed carrier on the unlicensed carrier.

The parameter of the discovery signal includes: a sending pattern, a power, a port, an occupied bandwidth, a time frequency resource, and a measurement pattern. Herein, the sending pattern includes a sending period, an offset, and a duration. The measurement pattern includes a measurement period, an offset, a duration, and a measurement gap.

In an exemplary embodiment, the parameter configuration module is arranged to configure a parameter of a discovery signal sent on an unlicensed carrier by an access point in a way that:

A parameter of a discovery signal sent on an unlicensed carrier by an access point is configured according to a centralized configuration mode, a distributed configuration mode or a mixed configuration mode.

The parameter configuration module is arranged to configure a parameter of a discovery signal sent on an unlicensed carrier by an access point according to the centralized configuration mode in a way that: a macro cell, a cluster head or a centralized controller allocates the parameter of the discovery signal sent on each unlicensed carrier by one or more neighboring access points centrally, or a certain neighboring access point is specified as a macro cell, a cluster head or a centralized controller to allocate the parameter of the discovery signal sent on each unlicensed carrier by one or more neighboring access points centrally.

The parameter configuration module is arranged to configure a parameter of a discovery signal sent on an unlicensed carrier by an access point according to the distributed configuration mode in a way that: the parameter of the discovery signal is configured on each unlicensed carrier by each access point.

The parameter configuration module is arranged to configure a parameter of a discovery signal sent on an unlicensed carrier by an access point according to the mixed configuration mode in a way that: after configuring the parameter of the discovery signal on each unlicensed carrier, each access point reports the parameter to the macro cell, the cluster head or the centralized controller; and the macro cell, the cluster head or the centralized controller performs coordinated adjustment.

In an exemplary embodiment, the control sending module is arranged to send the discovery signal on the unlicensed carrier in a way that:

Before preempting the unlicensed carrier, the control sending module sends the discovery signal on the unlicensed carrier.

Or, after preempting the unlicensed carrier, the control sending module sends the discovery signal on the preempted unlicensed carrier.

In an exemplary embodiment, the control sending module is further arranged to send the parameter of the discovery signal to the UE served by the unlicensed carrier and/or a neighboring access point of the access point.

In an exemplary embodiment, the control sending module is arranged to send the parameter of the discovery signal to the UE served by the unlicensed carrier and/or the neighboring access point of the access point in a way that:

The parameter of the discovery signal is sent to the UE by a licensed carrier or the preempted unlicensed carrier; or, The parameter of the discovery signal is transferred to the neighboring access point of the access point by backhaul or broadcast.

In an exemplary embodiment, the control sending module is further arranged to, before the access point sends the discovery signal on the unlicensed carrier, screen the unlicensed carrier on which a discovery signal will be sent according to a service situation, an interference situation and an occupation situation of the unlicensed carrier. Herein, the unlicensed carrier on which a discovery signal will be sent includes one or more unlicensed carriers.

In an exemplary embodiment, the control sending module is arranged to send the discovery signal on the unlicensed carrier in a way that:

When it is determined that one or more of the following conditions are satisfied, the discovery signal is sent on the unlicensed carrier:

a sending period of the discovery signal is greater than a preset period threshold;

a power of the discovery signal is smaller than a preset power threshold;

an occupied bandwidth of the discovery signal is smaller than a preset bandwidth threshold;

a duration of the discovery signal is smaller than a preset time threshold; and a number of ports of the discovery signal is smaller than a preset number threshold.

In an exemplary embodiment, the discovery signal includes:

a downlink reference signal, or a downlink reference signal after a corresponding protocol is modified.

In an exemplary embodiment, the downlink reference signal includes one or more of the following signals:

a PSS/SSS, a CRS, a CSI-RS, and a PRS.

An access point includes any above-mentioned apparatus for sending a discovery signal on an unlicensed carrier.

A computer program includes a program instruction. When the program instruction is executed by a computer, the computer can execute any above-mentioned method for sending a discovery signal on an unlicensed carrier.

A carrier carrying the computer program is provided.

Compared with the related art, according to the method and system for sending a discovery signal on an unlicensed carrier and an access point provided by the technical solution of the present disclosure, the discovery signal is used for coarse synchronization of the access point and served UE on the unlicensed carrier. Therefore, the sending of the discovery signal can shorten coarse synchronization time before the access point sends data. In addition, the discovery signal may be further used for measurement and discovery by the UE or the neighboring access point. Therefore, the sending of the discovery signal can make the access point select an unlicensed carrier having an optimal measurement result to compete and serve as a primary standby resource to provide for the UE. Thus, the spectral efficiency of the unlicensed carrier can be improved.

DETAILED DESCRIPTION

The embodiments of the present disclosure will be elaborated below in combination with the accompanying drawings. It needs to be noted that the embodiments in the present application and the features in the embodiments may be randomly combined without conflicts.

Embodiment

Figure 1:
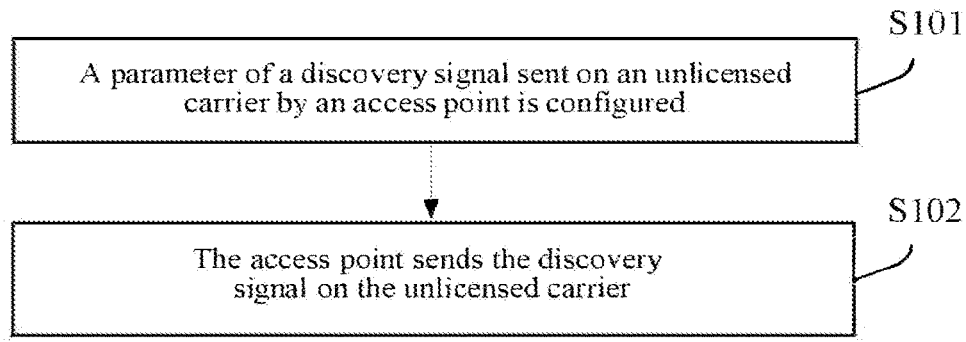
FIG. 1 is a flowchart of a method for sending a discovery signal on an unlicensed carrier according to an embodiment of the present disclosure.

As shown in FIG. 1, the present embodiment provides a method for sending a discovery signal on an unlicensed carrier, which includes the following steps S101-S102.

In step S101, a parameter of a discovery signal sent on an unlicensed carrier by an access point is configured.

The discovery signal is used for coarse synchronization, measurement and access point discovery of the access point and UE served by the unlicensed carrier on the unlicensed carrier. The access point discovery refers to that the access point sending the discovery signal is discovered by the served UE and a neighboring access point. Herein, both the access point and the UE capable of receiving/parsing the discovery signal sent by the access point can perform the above-mentioned coarse synchronization, measurement and access point discovery.

The parameter of the discovery signal includes: a sending pattern (a sending period, an offset, and a duration), a power, a port, an occupied bandwidth, a time-frequency resource, a measurement pattern (the measurement pattern includes a measurement period, an offset, a duration, and a measurement gap), and the like. The measurement pattern is used for the UE to measure the discovery signal according to the measurement pattern after the UE receives the discovery signal. For example, if the sending period of the discovery signal is 40 ms, the measurement period may be 160 ms. That is to say, the discovery signal is sent for four times, and the UE performs the measurement for one time. The measurement gap is used for the UE to perform different-frequency measurement.

Herein, the parameter of the discovery signal may be configured by means of the following three modes: a centralized mode, a distributed mode and a mixed mode. For the centralized configuration mode, a macro cell, a cluster head or a centralized controller may allocate centrally the parameter of several neighboring unlicensed carrier access points on each unlicensed carrier, or a certain neighboring access point is specified as a macro cell, a cluster head or a centralized controller to allocate centrally the parameter of a discovery signal sent on each unlicensed carrier by one or more neighboring access points, thereby ensuring mutual staggering or orthogonality, and avoiding mutual interference. For the distributed configuration mode, the parameter of the discovery signal of each unlicensed carrier access point on each unlicensed carrier may be self-configured. Advantages of the distributed configuration mode is flexible and convenient, and the advantages of the distributed configuration mode further include the signaling overhead can be reduced. Disadvantage of the distributed configuration mode lies in that several neighboring unlicensed carrier access points easily cause mutual interference. For the mixed configuration mode, each unlicensed carrier access point may perform self-configuration, and then reports to the macro cell, the cluster head or the centralized controller for coordinated adjustment.

Usually, a plurality of cells or access points are aggregated together to form a cluster, and a management network element of the cluster is usually called a cluster head or a centralized controller. The cluster head or the centralized controller may correspond to an independent entity network element, or may be a logic network element separated from a relevant network management device. For example, a certain access point is specified as the cluster head or the centralized controller.

In step S102, the access point sends the discovery signal on the unlicensed carrier.

Herein, the step that the access point sends the discovery signal on the unlicensed carrier specifically includes that: before preempting the unlicensed carrier, the access point sends compulsively the discovery signal on the unlicensed carrier; or, after preempting the unlicensed carrier, the access point sends the discovery signal on the preempted unlicensed carrier.

Meanwhile, the access point does not need to send the discovery signal on each unlicensed carrier. So, before the discovery signal is sent on an unlicensed carrier on which a service will be sent in step S102, the access point or the macro cell, cluster head or centralized controller and the access point specified to serve as the macro cell, cluster head or centralized controller may select certain unlicensed carriers to send the service according to factors such as a service situation, an interference situation and an occupation situation of the unlicensed carriers. The discovery signals need to be sent on these candidate unlicensed carriers on which services will be sent. The unlicensed carriers sending the discovery signals may be defined as a sending set. For example, there are five unlicensed carriers: CC1, CC2, CC3, CC4 and CC5, and according to the service situation and interference measurement or perception signal measurement, a base station or an unlicensed carrier access point discovers that CC1 and CC5 are frequently occupied, or current interference to the carriers is larger, and other three carriers are relatively idle. Therefore, CC2, CC3 and CC4 are selected as candidate occupied unlicensed carriers on which services will be sent by using a mechanism such as a Dynamic Frequency Selection, DFS, mechanism, and the discovery signal may be sent on the three unlicensed carriers on which services will be sent.

When one or more of the following conditions are satisfied, the access point sends the discovery signal on the unlicensed carrier:

a. the sending period of the discovery signal is greater than a preset period threshold;

b. the power of the discovery signal is smaller than a preset power threshold;

c. the occupied bandwidth of the discovery signal is smaller than a preset bandwidth threshold;

d. the duration of the discovery signal is smaller than a preset time threshold; and e. the number of ports of the discovery signal is smaller than a preset number threshold. In the present embodiment, the sending period of the discovery signal cannot be too small. If the sending period of the discovery signal is too small, e.g., the sending period of the discovery signal is less than 1 ms, an inter-system of the access point (such as an unlicensed carrier access point) is easily interfered by the discovery signal, such that an LAA/LTE-U inter-system is difficult to preempt a resource. In the present embodiment, the sending period of the discovery signal may be set as 40 ms, 80 ms, 160 ms or the like. For a WiFi system (LAA/LTE-U inter-system), a one-time preempting process thereof needs to take a few tens of us, and the maximum occupation duration is 32 ms (different in region and WiFi version), therefore the WiFi system will be slightly interfered, or the discovery signal may not influence the WiFi system to compete the unlicensed carrier resources since the sending period of the discovery signal is longer (40 ms, 80 ms, 160 ms). In addition, for a same-system, setting of the sending period may not interfere with the same-system. That is because the same-system can parse the discovery signal. Even if the same system detects the discovery signal, it may not be accordingly considered that the unlicensed carrier has been occupied at this moment.

In addition, the power/energy of the discovery signal in the present embodiment needs to meet requirements of an unlicensed spectrum. The discovery signal may be sent by using a small bandwidth. For example, the bandwidth which is used for the discovery signal data sending may be inconsistent with a bandwidth for data sending, and the discovery signal is sent in a reduced bandwidth form. The duration of the discovery signal cannot be too long. For example, the duration is 1 ms (one subframe). Several symbols or Resource Elements REs are probably used in one subframe.

In addition, for a country or region where an unlicensed carrier system is compulsively used to support a Listen before Talk LBT function, the discovery signal may not be sent before occupation, and the discovery signal may be sent when the above-mentioned conditions are satisfied.

Under special conditions, for example, when a primary system and a military system, such as a radar signal, preempt the unlicensed carrier, it is needed to give up the unlicensed carrier, and the discovery signal cannot be compulsively sent on the unlicensed carrier.

Herein, the discovery signal includes: a downlink reference signal in LTE, or a downlink reference signal after a corresponding protocol is modified. The downlink reference signal includes one or more of the following signals: a PSS/SSS, a CRS, a CSI-RS, and a PRS.

In general, the discovery signal may be sent in a long-period form, a small-bandwidth form, a few/single-port form, a short-occupation-time form, a low-power form or the like, to reduce influence on an unlicensed spectrum system caused by the discovery signal to the greatest extent. By taking a CSI-RS as an example, according to a relevant specification, a minimum sending period thereof is 5 ms (and 10 ms, 20 ms, 40 ms and 80 ms), and each Resource Block RB includes two REs, and supports 1, 2, 4 or 8 ports, which are p=15, p=15,16, p=15, . . . , 18 and p=15, . . . , 22 respectively. According to a sending principle for the above-mentioned discovery signal, the CSI-RS serving as the discovery signal may be sent in 40 ms, 80 ms or even a longer period. For example, the period is 80 ms, and the duration is 1 ms (one subframe). The CSI-RS may be sent only on a certain sub-band or a small bandwidth without needing to be sent on a 20 M bandwidth of an entire unlicensed carrier. The CSI-RS may be sent on a single port such as port 15 (or port 16, or port 15 and port 16), and on several symbols or REs probably used in one subframe. For example, one subframe includes 14 symbols, and the discovery signals are sent only on the symbol 5 and symbol 6, and a time-frequency resource occupation situation of the discovery signals is that the discovery signals are sent in a way of each RB only including granularities of two REs. When other signals are sent by serving as discovery signals, similar sending conditions may be adopted. For example, when a CRS serves as the discovery signal, it is only limited to use port 0. Configuration information about these discovery signals may be pre-configured.

The specific functions of the discovery signal may include: a. synchronization processing, for example, coarse synchronization may be obtained by utilizing PSS/SSS and CRS signals; b. Radio Resource Management RRM measurement, for example, RRM may be performed by utilizing CRS and CSI-RS signals; c. discovery of an access point which is performed by the UE using a discovery signal; and d. discovery of a neighboring access point which may be performed by an access point using a discovery signal.

On the basis of a, sending of the discovery signal may shorten the coarse synchronization time before data is sent after the unlicensed carrier access point preempts the right to use the unlicensed carrier.

On the basis of b, c and d, the UE receives discovery signals sent by several access points under the same operator to obtain a discovery set {access point 1, access point 2, . . . , access point n}, executes the RRM measurement, and reports a discovery result and a measurement result to the base station (may be sent through a licensed carrier or an occupied unlicensed carrier). The base station may select access points corresponding to three optimal measurement results as candidate access points to occupy the unlicensed carrier. In combination with other factors, such as a load condition of each access point, one or more access points are selected as candidate occupation access points to compete with an inter-system or inter-operator access point over resources. In another aspect, the UE receives discovery signals sent by the same access point on several unlicensed carriers, and measures the discovery signals received on the several unlicensed carriers to obtain a measurement result, and feeds the measurement result back to the access point. The access point may select unlicensed carriers corresponding to one or more optimal measurement results to compete and serve as a primary standby resource to provide a service for the UE. The above-mentioned two scenarios can ensure that an access point and unlicensed carrier having an optimal situation or a comprehensive optimal performance are selected to provide the service for the UE. Thus, the spectral efficiency of the unlicensed carrier can be improved.

Figure 2:
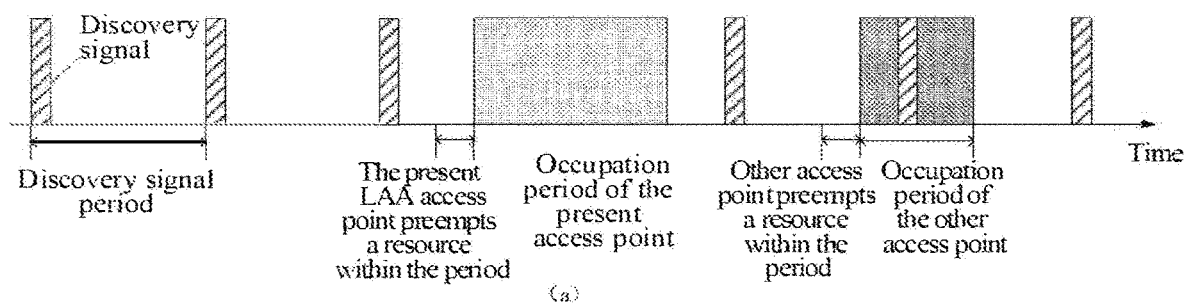
FIG. 2 is a schematic diagram of sending a discovery signal by an access point on a time axis of an entire unlicensed carrier in a set period according to an embodiment of the present disclosure.
Figure 2:
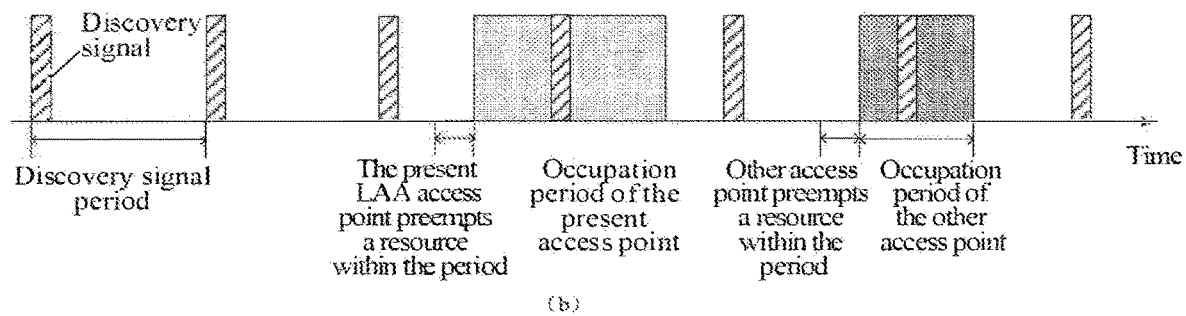

In the present embodiment, the access point may send the discovery signal only when the access point does not occupy the unlicensed carrier. Thus, the synchronization time before data is sent and after the access point preempts the right to use the unlicensed carrier may be reduced. After the unlicensed carrier is preempted, the access point may maintain synchronization and data sending by using a relevant mechanism. As shown in FIG. 2(a), after preempting the unlicensed carrier, the discovery signal is not sent within an occupation period of the present access point, and synchronization is completed by using a normally sent signal.

In addition, sending of the discovery signal may be as shown in FIG. 2(b). The discovery signal is also sent within the occupation period of the present access point, including non-occupation period of the unlicensed carrier and occupation period of the unlicensed carrier. That is, the access point may send the discovery signal on the time axis of the entire unlicensed carrier according to a set sending pattern. Although the overhead is increased, the discovery signal is different from a downlink reference signal in the relevant mechanism in function. During the occupation period of the unlicensed carrier by the access point, some UEs do not send services, and due to a UE low-power-consumption demand, the UEs are not required to perform fine synchronization tracking when no service is sent. However, to be capable of immediately performing fine synchronization and shortening the coarse synchronization time once service transmission is started, and coarse synchronization needs to be maintained by using the discovery signal. In another case, the access point sends the discovery signal when occupying the unlicensed carrier to assist the coarse synchronization of a neighboring access point which does not occupy the unlicensed carrier and does not sent the discovery signal.

In addition, after the step S101, the method further includes that: the access point or the macro cell, cluster head or centralized controller (herein, an access point specified as the macro cell, cluster head or centralized controller is further included) sends the parameter of the discovery signal of the unlicensed carrier to the UE and/or the neighboring access point.

Herein, the step that the access point or the macro cell, cluster head or centralized controller sends the parameter of the discovery signal to the UE and/or the neighboring access point includes the following steps.

The access point sends the parameter of the discovery signal to the UE by a licensed carrier or the preempted unlicensed carrier.

Or, the macro cell, cluster head or centralized controller sends the parameter of the discovery signal to the UE by the licensed carrier.

The access point or the macro cell, cluster head or centralized controller transfers the parameter of the discovery signal with the neighboring access point interactively by backhaul or broadcast.

In the above-mentioned step that the parameter of the discovery signal is sent to the UE by the licensed carrier or the unlicensed carrier, Radio Resource Control RRC signaling notification may be performed.

Figure 3:
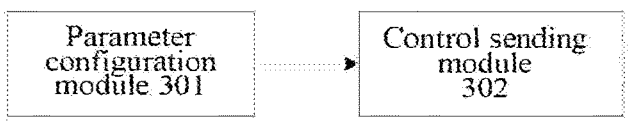
FIG. 3 is a structural diagram of a system for sending a discovery signal on an unlicensed carrier according to an embodiment of the present disclosure.

As shown in FIG. 3, the present embodiment provides an apparatus for sending a discovery signal on an occupied unlicensed carrier, which includes a parameter configuration module 301 and a control sending module 302.

The parameter configuration module 301 is arranged to configure a parameter of a discovery signal sent on an unlicensed carrier by an access point.

The control sending module 302 is arranged to send the discovery signal on the unlicensed carrier.

Herein, the discovery signal is used for coarse synchronization, measurement and access point discovery of the access point and the served UE on the unlicensed carrier.

The parameter of the discovery signal include: a sending pattern, a power, a port, an occupied bandwidth, a time-frequency resource, and a measurement pattern. Herein, the sending pattern includes a sending period, an offset, and a duration. The measurement pattern includes a measurement period, an offset, a duration, and a measurement gap.

Herein, the parameter configuration module 301 is arranged to configure a parameter of a discovery signal sent on an unlicensed carrier by an access point according to a centralized configuration mode, a distributed configuration mode or a mixed configuration mode.

The centralized configuration mode includes that: a macro cell, a cluster head or a centralized controller allocates the parameter of a discovery signal sent on each unlicensed carrier by one or more neighboring access points centrally, or a certain neighboring access point is specified as a macro cell, a cluster head or a centralized controller to allocate the parameter of a discovery signal sent on each unlicensed carrier by one or more neighboring access points centrally.

The distribution configuration mode includes that: the parameter of the discovery signal is configured on each unlicensed carrier by each access point.

The mixed configuration mode includes that: after configuring the parameter of the discovery signal on each unlicensed carrier, each access point reports the parameter to the macro cell, the cluster head or the centralized controller, and the macro cell, the cluster head or the centralized controller performs coordinated adjustment.

Herein, the control sending module 302 is arranged to send the discovery signal on the unlicensed carrier in the following way.

Before preempting the unlicensed carrier, the control sending module 302 sends the discovery signal on the unlicensed carrier; or, after preempting the unlicensed carrier, the control sending module 302 sends the discovery signal on the preempted unlicensed carrier.

Herein, the control sending module 302 is further arranged to send the parameter of the discovery signal to the served UE and/or a neighboring access point of the access point.

Herein, the control sending module 302 is further arranged to send the parameter of the discovery signal to the served UE and/or the neighboring access point of the access point in the following way.

The parameter of the discovery signal is sent to the UE by a licensed carrier or the preempted unlicensed carrier.

Or, the parameter of the discovery signal is transferred to the neighboring access point of the access point by backhaul or broadcast.

Herein, the control sending module 302 is further arranged to, before the discovery signal is sent on the unlicensed carrier, screen an unlicensed carrier on which the discovery signal will be sent according to a service situation, an interference situation and an occupation situation of the unlicensed carriers. Herein, the unlicensed carrier on which the discovery signal will be sent includes one or more unlicensed carriers.

Herein, the control sending module 302 is further arranged to send the discovery signal on the unlicensed carrier when one or more of the following conditions are satisfied:

the sending period of the discovery signal is greater than a preset period threshold;

the power of the discovery signal is smaller than a preset power threshold;

the occupied bandwidth of the discovery signal is smaller than a preset bandwidth threshold;

the duration of the discovery signal is smaller than a preset time threshold; and the number of ports of the discovery signal is smaller than a preset number threshold.

Herein, the discovery signal includes: a downlink reference signal, or a downlink reference signal after a corresponding protocol is modified.

Herein, the downlink reference signal includes one or more of the following signals: a PSS/SSS, a CRS, a CSI-RS, and a PRS.

In addition, the present embodiment also provides an access point, which includes: the above apparatus for sending a discovery signal on an occupied unlicensed carrier.

The embodiments of the present disclosure also disclose a computer program, which includes a program instruction. When the program instruction is executed by a computer, the computer can execute any above-mentioned method for sending a discovery signal on an unlicensed carrier.

The embodiments of the present disclosure also disclose a carrier carrying the computer program.

From the above-mentioned embodiments, it can be seen that compared with the related art, according to the method and apparatus for sending a discovery signal on an occupied unlicensed carrier and an access point provided in the above-mentioned embodiments, the discovery signal is used for coarse synchronization of the access point and served UE on the unlicensed carrier, and therefore, sending of the discovery signal may shorten coarse synchronization time before data are sent. In addition, the discovery signal may be further used for measurement and discovery by the UE or the neighboring access point. Therefore, sending of the discovery signal may make the access point select an unlicensed carrier corresponding to an optimal measurement result to compete and serve as a primary standby resource to provide a service for the UE. Thus, the spectral efficiency of the unlicensed carrier can be improved.

Those of ordinary skill in the art may understand that all or some of the steps in the above-mentioned method may be implemented by instructing related hardware via a program. The program may be stored in a computer-readable storage medium such as a read-only memory, a magnetic disk or an optical disk. In an exemplary embodiment, all or some of the steps in the above-mentioned embodiments may also be implemented by using one or more integrated circuits.

Accordingly, each module/unit in the above-mentioned embodiments may be implemented in a form of hardware, or may be implemented in a form of a software function module. The present disclosure is not limited to combination of hardware and software in any specific form.

The above is only the embodiments of the present disclosure, and not intended to limit the scope of protection of the present disclosure. According to the summary of the present disclosure, various other embodiments may be provided. Those skilled in the art may make various corresponding changes and transformations according to the present disclosure without departing from the rule and essence of the present disclosure. Any modifications, equivalent replacements, improvements and the like made within the spirit and principle of the present disclosure should fall within the scope of protection of the present disclosure.

INDUSTRIAL APPLICABILITY

The technical solution of the present disclosure can reduce the time for processing items other than data sending (such as synchronization) after the access point preempts a resource each time, and can improve the spectral efficiency of the unlicensed carrier. Therefore, the present disclosure has a strong industrial applicability.

What we claim is:

1. A wireless communication method, comprising:
configuring, by an access point, a parameter of a discovery signal sent on an unlicensed carrier,
wherein the parameter includes a sending period of the discovery signal, a duration of the discovery signal, and an offset of the discovery signal;
determining, by the access point, that the duration of the discovery signal is smaller than a preset time threshold; and
sending, by the access point, the discovery signal on the unlicensed carrier after the access point preempts the unlicensed carrier,
wherein the discovery signal comprises a primary synchronization signal (PSS), a secondary synchronization signal (SSS), and a channel state information-reference signal (CSI-RS),
wherein the discovery signal is used for coarse synchronization, measurement and access point discovery of the access point and user equipment (UE) served by the unlicensed carrier on the unlicensed carrier,
wherein the parameter of the discovery signal comprises: a sending pattern, a power, a port, an occupied bandwidth, a time-frequency resource, and a measurement pattern,
wherein the sending pattern comprises the sending period, the offset, and the duration, and
wherein the measurement pattern comprises a measurement period, the offset, the duration, and a measurement gap.

2. The method of claim 1,
wherein the parameter of the discovery signal sent on the unlicensed carrier is configured by the access point according to a centralized configuration mode by:
allocating, by a macro cell, a cluster head or a centralized controller, the parameter of the discovery signal sent on each unlicensed carrier by one or more neighboring access points centrally, or
specifying a certain neighboring access point as the macro cell, the cluster head or the centralized controller to allocate the parameter of the discovery signal sent on each unlicensed carrier by the one or more neighboring access points centrally.

3. The method of claim 1, further comprising:
sending the parameter of the discovery signal to a user equipment (UE) served by the unlicensed carrier or a neighboring access point of the access point by:
sending the parameter of the discovery signal to the UE by a licensed carrier or the unlicensed carrier that is preempted; or
transferring the parameter of the discovery signal to the neighboring access point of the access point by backhaul or broadcast.

4. The method of claim 1, wherein before the access point sends the discovery signal on the unlicensed carrier, the method further comprises:
screening the unlicensed carrier on which the discovery signal will be sent according to a service situation, an interference situation and an occupation situation of the unlicensed carrier, wherein the unlicensed carrier on which the discovery signal will be sent comprises one or more unlicensed carriers.

5. The method of claim 1,
wherein the discovery signal comprises a downlink reference signal,
wherein the downlink reference signal comprises any one or more of the following signals: a Primary Synchronization Signal (PSS) or a Secondary Synchronization Signal (SSS), a Cell-specific Reference Signal (CRS), a Channel State Information-Reference Signal (CSI-RS), and a Position Reference Signal (PRS).

6. A wireless communication method, comprising:
receiving, by a user equipment, a parameter that indicates a duration of a discovery signal, wherein the duration of the discovery signal is smaller than a preset time threshold; and
receiving, by the user equipment, the discovery signal on an unlicensed carrier,
wherein the discovery signal comprises a primary synchronization signal (PSS), a secondary synchronization signal (SSS), and a channel state information-reference signal (CSI-RS),
wherein the parameter of the discovery signal comprises: a sending pattern, a power, a port, an occupied bandwidth, a time-frequency resource, and a measurement pattern,
wherein the sending pattern comprises a sending period, an offset, and the duration, and
wherein the measurement pattern comprises a measurement period, the offset, the duration, and a measurement gap.

7. The method of claim 6, wherein the discovery signal is received on the unlicensed carrier that is preempted.

8. The method of claim 6, wherein the parameter of the discovery signal is received by a licensed carrier or the unlicensed carrier that is preempted.

9. An access point, comprising:
a processor configured to:
configure a parameter of a discovery signal sent on an unlicensed carrier,
wherein the parameter includes a sending period of the discovery signal, a duration of the discovery signal, and an offset of the discovery signal;
determine that the duration of the discovery signal is smaller than a preset time threshold; and
send the discovery signal on the unlicensed carrier after the access point preempts the unlicensed carrier,
wherein the discovery signal comprises a primary synchronization signal (PSS), a secondary synchronization signal (SSS), and a channel state information-reference signal (CSI-RS),
wherein the discovery signal is used for coarse synchronization, measurement and access point discovery of the access point and user equipment (UE) served by the unlicensed carrier on the unlicensed carrier,
wherein the parameter of the discovery signal comprises: a sending pattern, a power, a port, an occupied bandwidth, a time-frequency resource, and a measurement pattern,
wherein the sending pattern comprises the sending period, the offset, and the duration, and
wherein the measurement pattern comprises a measurement period, the offset, the duration, and a measurement gap.

10. The access point of claim 9,
wherein the parameter of the discovery signal sent on the unlicensed carrier is configured by the access point according to a centralized configuration mode by the processor configured to:
allocate, by a macro cell, a cluster head or a centralized controller, the parameter of the discovery signal sent on each unlicensed carrier by one or more neighboring access points centrally, or
specify a certain neighboring access point as the macro cell, the cluster head or the centralized controller to allocate the parameter of the discovery signal sent on each unlicensed carrier by the one or more neighboring access points centrally.

11. The access point of claim 9, wherein the processor is further configured to:
send the parameter of the discovery signal to a user equipment (UE) served by the unlicensed carrier or a neighboring access point of the access point by:
send the parameter of the discovery signal to the UE by a licensed carrier or the unlicensed carrier that is preempted; or
transfer the parameter of the discovery signal to the neighboring access point of the access point by backhaul or broadcast.

12. The access point of claim 9, wherein before the processor is configured to send the discovery signal on the unlicensed carrier, the processor is further configured to:
screen the unlicensed carrier on which the discovery signal will be sent according to a service situation, an interference situation and an occupation situation of the unlicensed carrier, wherein the unlicensed carrier on which the discovery signal will be sent comprises one or more unlicensed carriers.

13. The access point of claim 9,
wherein the discovery signal comprises a downlink reference signal,
wherein the downlink reference signal comprises any one or more of the following signals: a Primary Synchronization Signal (PSS) or a Secondary Synchronization Signal (SSS), a Cell-specific Reference Signal (CRS), a Channel State Information-Reference Signal (CSI-RS), and a Position Reference Signal (PRS).

14. A user equipment, comprising:
a processor configured to:
receive a parameter that indicates a duration of a discovery signal, wherein the duration of the discovery signal is smaller than a preset time threshold; and
receive the discovery signal on an unlicensed carrier, wherein the discovery signal comprises a primary synchronization signal (PSS), a secondary synchronization signal (SSS), and a channel state information-reference signal (CSI-RS), wherein the parameter of the discovery signal comprises: a sending pattern, a power, a port, an occupied bandwidth, a time-frequency resource, and a measurement pattern, wherein the sending pattern comprises a sending period, an offset, and the duration, and wherein the measurement pattern comprises a measurement period, the offset, the duration, and a measurement gap.

15. The user equipment of claim 14, wherein the discovery signal is received on the unlicensed carrier that is preempted.

16. The user equipment of claim 14, wherein the parameter of the discovery signal is received by a licensed carrier or the unlicensed carrier that is preempted.

* * * * *